United States Patent
Autenrieth et al.

(10) Patent No.: US 6,972,159 B2
(45) Date of Patent: Dec. 6, 2005

(54) FUEL CELL SYSTEM

(75) Inventors: Rainer Autenrieth, Grossbottwar (DE); Robert Gerberich, Kempten (DE); Gerhard Konrad, Ulm (DE); Karsten Ledwig, Ehringshausen (DE); Michael Niehues, Ulm (DE); Markus Walter, Metzingen (DE)

(73) Assignee: DaimlerChrysler AG, Stuttgart (DE)

( * ) Notice: Subject to any disclaimer, the term of this patent is extended or adjusted under 35 U.S.C. 154(b) by 301 days.

(21) Appl. No.: 10/153,307

(22) Filed: May 22, 2002

(65) Prior Publication Data

US 2002/0182454 A1 Dec. 5, 2002

(30) Foreign Application Priority Data

May 23, 2001 (DE) ................................ 101 25 106

(51) Int. Cl.⁷ ...................... H01M 14/00; H01M 8/00; H01M 8/04; H01M 8/12; H01M 10/44
(52) U.S. Cl. .............................. 429/7; 429/12; 429/13; 429/23; 320/101; 320/103; 204/DIG. 4
(58) Field of Search .............................. 429/3, 7, 9, 12, 429/13, 23; 320/103, 101; 204/DIG. 4

(56) References Cited

U.S. PATENT DOCUMENTS

| | | | | |
|---|---|---|---|---|
| 3,808,522 A | * | 4/1974 | Sharaf | 324/430 |
| 4,128,700 A | * | 12/1978 | Sederquist | 429/17 |
| 4,839,574 A | * | 6/1989 | Takabayashi | 320/101 |
| 4,931,947 A | * | 6/1990 | Werth et al. | 700/297 |
| 5,814,970 A | | 9/1998 | Schmidt | 320/118 |
| 6,380,638 B1 | | 4/2002 | Bitsche et al. | 290/40 |
| 2002/0109406 A1 | | 8/2002 | Aberle et al. | 307/10.1 |

FOREIGN PATENT DOCUMENTS

| | | |
|---|---|---|
| DE | 4427077 | 3/1996 |
| DE | 19810467 | 10/1999 |
| DE | 10102243 | 10/2002 |
| EP | 0782209 | 7/1997 |

* cited by examiner

Primary Examiner—Patrick Joseph Ryan
Assistant Examiner—Julian Mercado
(74) Attorney, Agent, or Firm—Davidson, Davidson & Kappel, LLC

(57) ABSTRACT

A fuel-cell system, in particular for a vehicle, has a device for supplying the operating agents for a fuel cell and an electrical energy accumulator. The energy accumulator is composed of a battery and of an intermediate charge store which has a lower internal resistance than the battery. A switch is provided in the electrical connection between the energy accumulator and the fuel cell.

20 Claims, 2 Drawing Sheets

FUEL CELL SYSTEM

Priority to German Patent Application No. DE 101 25 106.8-45, filed May 23, 2001 and incorporated hereby by reference herein, is claimed.

BACKGROUND INFORMATION

The present invention is directed to a fuel-cell system with an energy accumulator, as well as to a method for operating such a fuel-cell system.

A fuel-cell system is disclosed in European Patent Application No. 0 782 209 A1. This fuel-cell system has a battery to enable the fuel cell, which depending on the particular system is relatively sluggish, to be used in systems having very high dynamic power-supply requirements.

Generally, when the fuel cells and the battery are coupled, due to the existing curves of the fuel cell and the comparatively stiff curve of the battery, an operating point corresponding to the point of intersection of these curves sets in. However, this operating point is often not desired, since such high currents are not necessary for charging the battery, or because the fuel cell is not being used under optimal operating conditions. As a result, the power efficiency of the system is degraded due to the comparatively high internal resistance of the battery and the unfavorable operating conditions of the fuel cell.

The above-mentioned EP 0 782 209 A1 describes a system, composed of a resonant circuit, transformer and rectifier, which is used between the battery and the fuel cell. The design of this system is basically that of a DC/DC converter. The DC/DC converter makes it possible for the fuel-cell and battery curves to be fully decoupled from one another, and the most favorable operating conditions are able to be adjusted for the battery and the fuel cell, respectively, without elements adversely affecting one another.

However, the design utilizing the DC/DC converter constitutes a serious disadvantage in the series production of such systems, for example when they are intended for use in motor vehicles. DC/DC converters of this kind are frequently prone to failure, require a relatively large installation space and, in particular, are very expensive, so that the installation, on the whole, is made substantially more expensive. This has serious disadvantageous effects on the economic efficiency of such systems in the above application case of fuel-cell systems in a motor vehicle, because of the comparatively high piece numbers to be expected.

SUMMARY OF THE INVENTION

It is, therefore, an object of the present invention to devise a fuel-cell system, as well as a method for operating such a fuel-cell system, which will avoid the above-mentioned related-art disadvantages and which will constitute a cost-effective, rugged and reliable system.

The present invention provides a fuel-cell system comprising devices for supplying the operating agents for a fuel cell and comprising an electrical energy accumulator, wherein the energy accumulator (5) has a battery (6) and an intermediate charge store (7) having a lower internal resistance ($R_{i,IZS}$) than the internal resistance ($R_{i,BAT}$) of the battery (6), a switch (9) being provided in the electrical connection between the energy accumulator (5) and the fuel cell (2).

Such an energy accumulator design, composed of a battery and an intermediate charge store having a substantially lower internal resistance than that of the battery, and the use of a switch between the energy accumulator and the fuel cell, makes it possible to operate a fuel-cell system of this kind with an excellent power efficiency, while entailing a minimum number of components.

The switch enables the fuel-cell system to be activated or deactivated depending on the fuel cell's available power output. Should the situation arise that the fuel cell is not able to provide the necessary power, then the switch is opened and the connected electrical loads draw their power directly from the battery. When the fuel cell has recovered, the switch may be closed and the comparatively high current that sets in is, for the most part, stored temporarily in the intermediate charge store, and only a comparatively small portion attains the battery and charges the same. In this context, the loads are able to continue to draw the required electrical power from the area of the battery. If, at this point, the switch is opened again because the fuel cell is again operating in a critical region of its curve, the battery may then continue to be recharged by the charge intermediately stored in the intermediate charge store, while the fuel cell that is decoupled from the system is able to recover again.

Through continuous actuation of the switch in a suitable rhythm, for example in dependence upon the preset limiting voltages, as provided by one particularly beneficial exemplary embodiment of the method according to the present invention, the system voltage is able to be retained within a voltage range or voltage window, thus, in practical limits, kept virtually constant.

The present invention also provides a method for operating a fuel-cell system, wherein, to charge the energy accumulator (5), a system voltage ($U_0$) of the fuel-cell system (1) is regulated such that, in response to an opening or closing of the switch (9) between the fuel cell (2) and the energy accumulator (5), the system voltage ($U_0$) is kept constant within a predefined voltage range.

Thus, the fuel cell is not operated at a specific operating point, but is able to repeatedly run through at least a portion of its curve, the individual cycles being presettable through actuation of the switch. As a result, the energy accumulator is able to be charged with the power supplied by the fuel cell, while the, in part, extremely dynamic power requirements of the loads are supplied by the energy accumulator.

In this context, due to its very stiff curve, an energy accumulator, in particular a battery, is able to fulfill very high dynamic requirements, which would be very difficult and/or expensive for a fuel cell to meet. In particular, in the operation of the fuel cell for a gas-generating system, which synthesizes the hydrogenous gas required for the anode side, a highly dynamic operation of the fuel cell would mean that this gas-generating system would also have to supply, in a highly dynamic fashion, the necessary quantities of operating agents. However, to develop a highly dynamic design of a gas-generating system of this kind, which is generally known from the related art, stringent requirements would arise, which could only be met with a substantial outlay for components, development and costs.

The battery of the system according to the present invention, in the system type according to the present invention, is easily able to meet these highly dynamic requirements, simply and cost-effectively, rendering possible a gas-generating system design that is comparatively simple and, therefore, represents cost savings.

BRIEF DESCRIPTION OF THE DRAWINGS

Further advantageous embodiments of the present invention are derived from the dependent claims, as well as from the exemplary embodiment described in the following on the basis of the drawing, in which:

DETAILED DESCRIPTION

Figure 1:
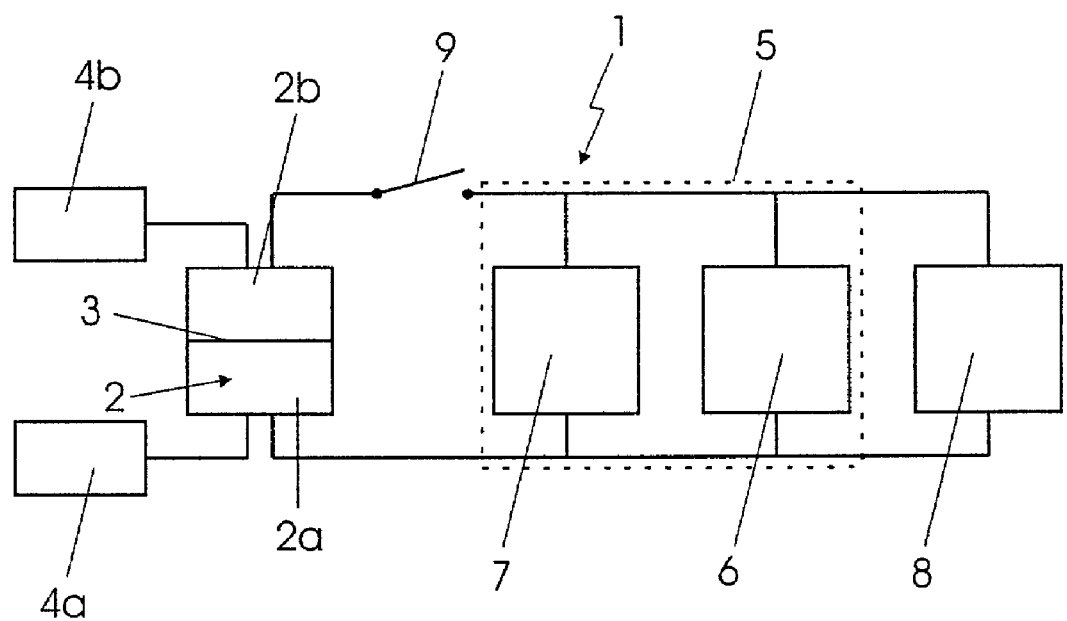
FIG. 1 shows a schematic representation of an exemplary design of the fuel-cell system according to the present invention.

FIG. 1 illustrates the underlying principle of the design of a fuel-cell system 1 according to the present invention. Fuel-cell system 1 has a fuel cell 2, including an anode region 2a and a cathode region 2b. Here, anode region 2a of fuel cell 2 is separated by a proton-exchange membrane 3 (PEM) from cathode region 2b of fuel cell 2. Besides being a single cell, fuel cell 2 is defined to include a fuel-cell stack as well. In addition to PEM fuel cell 2 selected for the exemplary embodiment, many other types of fuel cells 2 are, of course, also conceivable in connection with the designs described here, such as phosphoric acid fuel cells, direct methanol fuel cells, or the like.

Anode region 2a is coupled via a device 4a for supplying fuel cell 2 with operating agents, here, in particular, a gas-generating system 4a, through which anode region 2a of fuel cell 2 is able to be supplied with the operating agent it requires, in the context of a PEM fuel cell, generally with hydrogen.

Cathode region 2b of fuel cell 2 is likewise connected via a device 4b for supplying operating agents, here, for example, an air-supply system 4b.

Also disposed in the region of fuel cell 2 are electrical lines, which are able to conduct the electrical power generated by fuel cell 2 to an energy accumulator 5. Energy accumulator 5 is composed of a battery 6, as well as of an intermediate charge store 7, intermediate charge store 7 having a substantially lower internal resistance $R_{i,LZS}$ than battery 6 ($R_{i,BAT}$).

Also connected to energy accumulator 5 is an electrical load 8, indicated here schematically, which obtains the electrical power it requires from the area of energy accumulator 5.

In the preferred application case of fuel-cell system 1, namely in a vehicle, electrical load 8 may be the vehicle's entire electrical system, and, in some instances, its engine as well. It is fundamentally assumed that electrical load 8 at least partially exhibits a very dynamic response with respect to its electric power requirements. Thus, for example, within the span of a few fractions of a second, considerable electrical power may be needed in a vehicle's electrical system vehicle for electrical loads 8, due to rapid acceleration or due to power-intensive consumers, such as air-conditioning units, radios, or the like, being suddenly brought onto load. Depending on the particular system, a fuel cell 2 is not able to meet these high dynamic requirements, especially when it is coupled to a gas-generating system 4a which supplies it with the operating agents necessary for operation.

Since it is extremely expensive and entails considerable effort to design and build gas-generating systems 4a of this kind and fuel cells 2 coupled thereto for highly dynamic requirements, the use of an energy accumulator 5 in cooperation with fuel cell 2 constitutes a very favorable design. Fuel-cell system 1 is able namely, in the manner described here, via battery 6 having a highly dynamic load capability depending on the particular system, fulfill the very high dynamic load requirements of system, which may arise, in particular, during use in a vehicle in water, on the land, or in the air.

On the other hand, depending on the system, due to the very stiff curve of a battery and the comparatively rather soft curve of a fuel cell, in response to direct coupling of fuel cell 2 and battery 6, an operating point sets in, which either loads the fuel cell in a very unfavorable manner or utilizes its load capacity only insufficiently, and which, on the other hand, effects charging currents from fuel cell 2 to the battery, which are very high. Because of the generally very high internal resistance $R_{i,BAT}$ of battery 6, considerable power losses arise in battery 6 due to the very high charging currents. In a disadvantageous case, the heat generated by these power losses in the region of internal resistance $R_{i,BAT}$ of battery 6 can even lead to destruction of battery 6, or, at the least, seriously reduce its expected lifetime.

For that reason, fuel-cell system 1 in accordance with FIG. 1 has a switch 9, via which the connection between fuel cell 2 and energy accumulator 5 may be interrupted. In this context, basically any type of switch is conceivable. Especially beneficial is, however, a switch 9 made of semiconductor components, such as MOSFETs, since they are able to be actuated quickly, simply, and virtually losslessly by a control unit or the like, via comparatively low switching voltages.

Figure 2:
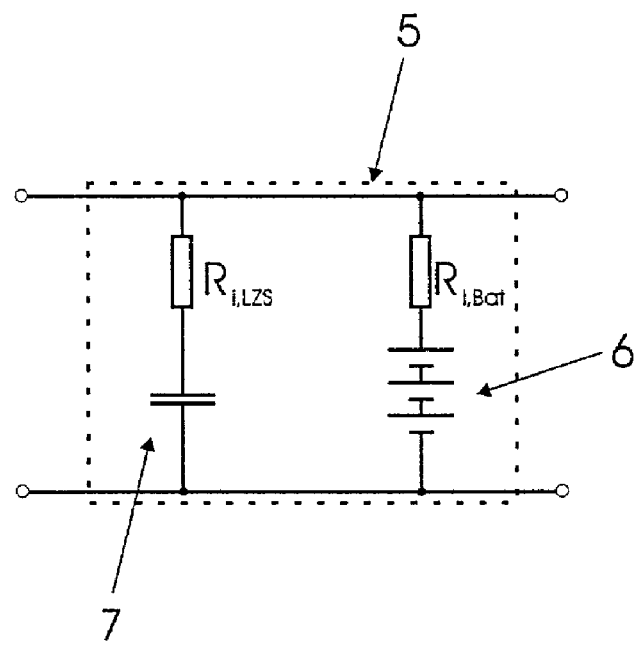
FIG. 2 shows a detailed basic representation of the energy accumulator of the fuel-cell system according to FIG. 1.

A somewhat more detailed, but still schematic representation of energy accumulator 5 is illustrated in FIG. 2. Battery 6 is shown together with its internal resistance $R_{i,BAT}$. In battery 6, an intermediate charge store 7, schematically indicated here as a capacitor, is connected in parallel to battery 6 in energy accumulator 5. In a real design, intermediate charge store 7 also has an internal resistance $R_{i,LZS}$ shown here. At this point, to be able to temporarily store energy originating from fuel cell 2 in intermediate charge store 7 without substantial losses, even given very high currents, internal resistance $R_{i,LZS}$ of intermediate charge store 7 must be distinctly lower than internal resistance $R_{i,BAT}$ of battery 6.

For the most part, further demands are not made of intermediate charge store 7, so that, as the capacitor shown here, it may be designed as a supercap or also as a coil.

Fuel-cell system 1, including switch 9, as well as energy accumulator 5, may be operated quite effectively in the following manner:

An example is assumed where system voltage $U_0$ is to be precisely regulated in the system to +/−5 volts. If system voltage $U_0$ drops below a limiting voltage of $U_1=U_0-5V$, then fuel cell 2 switches on in response to a closing of switch 9. A certain current I flows into the region of energy accumulator 5. Due to the comparatively low internal resistance $R_{i,LZS}$ of intermediate charge store 7, here capacitor 7, the greatest portion of the current flows into the capacitor. Not until the capacitor has taken up an equivalent charge, the terminal voltage having risen further, will the battery be increasingly charged.

Once an upper limiting voltage $U_2=U_0+5V$ is reached, fuel cell 2, in response to an opening of switch 9, is again cut off from energy accumulator 5. However, subsequently to fuel cell 2 being switched off, battery 6 is further charged from capacitor 7. At the same time, loads 8 may continue to be supplied with voltage from the area of battery 6 and capacitor 7. After lower limiting voltage $U_1$ is again undershot, fuel cell 2 then switches on again in response to a closing of switch 9, and the control loop begins anew.

Through this arrangement, when battery 6 is charged, the charging current is not directed directly to battery 6, which would lead to high charging losses, accompanied by substantial heat generation, due to very high current I and comparatively high internal resistance $R_{i,BAT}$ of battery 6. Rather, capacitor 7 acts as an intermediate store for the current. In this manner, the charging losses at internal resistance $R_{i,BAT}$ of battery 6 and internal resistance $R_{i,LZS}$ of capacitor 7 are able to be substantially reduced.

Moreover, this system, as already mentioned several times, is able to respond to load jumps in fractions of seconds, since, in comparison to fuel cell 2, battery 6 permits a substantially higher dynamic response, depending on the system. For short-term power requirements, such as voltage peaks, for example, when a large electric motor runs up, the system's capacity is, in part, even clearly above that of fuel cell 2, due to additional capacitor 7.

As long as sufficient operating agents are fed from gas-generating system 4a and air-supply system 4b to fuel cell 2, the system is able to deliver power which follows, accordingly, from the sum of the power of fuel cell 2 and the power of battery 6 and, respectively, energy accumulator 5.

If, in the area of fuel cell 2 or in the connection between gas-generating system 4a and anode region 2a of fuel cell 2, further volumes are situated which are able to intermediately store operating agents, then, given a switched-off gas-generating system 4a, fuel cell 2 may continue to supply power for a plurality of seconds. Of course, this is also possible when more power is required for the short term than the power that is equivalent to a quantity of operating agents that can be made available by gas-generating system 4a. The additional storage volumes may, in this context, be constituted of additional storage tanks or of the line lengths themselves.

Figure 3:
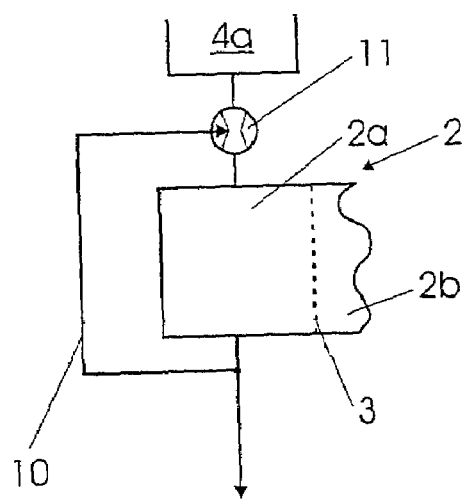
FIG. 3 shows a schematic representation showing the supplying of operating agents to an anode side of a fuel cell of the fuel-cell system according to FIG. 1.

FIG. 3 illustrates exemplarily the set-up of the connection between gas-generating system 4a and anode region 2a of fuel cell 2. Here, a circuit is formed via a bypass 10, anode region 2a being a component of this circuit. The operating agent may be circulated in this circuit, which may be useful, on the one hand, for storing the operating agent and, on the other hand, for cooling anode region 2a. To make available the energy required for recirculation, in accordance with the exemplary embodiment in FIG. 3, a jet pump 11 is used, which operates the circuit with the aid of the kinetic energy contained in the volumetric flow delivered by gas-generating system 4a to anode region 2a.

Besides such an approach using a bypass 10, one can conceive, of course, of other intermediate storage possibilities, such as expanded line regions in storage tanks, line lengths intentionally selected to be large, or the like.

Figure 4:
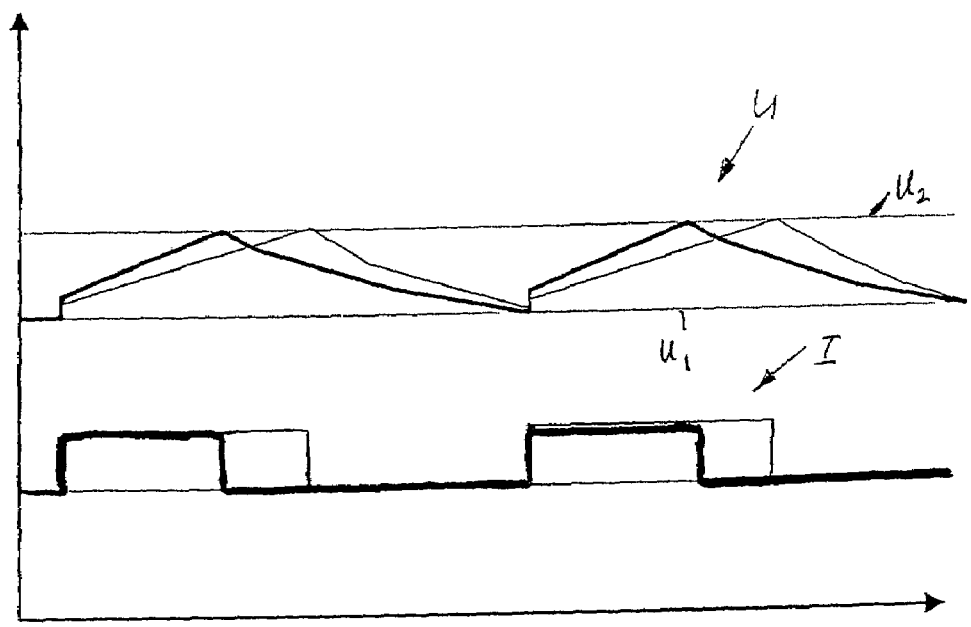
FIG. 4 shows a schematic representation of the characteristic curve of the system voltage and of the current originating at the fuel cell in a voltage-over-time and, respectively, a current-over-time diagram.

In a diagram, FIG. 4 plots the time characteristic of current I and voltage U in fuel-cell system 1. The thick line characterizes the characteristic curve of quantities upon charging of battery 6. The thin lines show the characteristic curve of quantities given a loaded fuel-cell system 1. It is discernible here that, through a pulse-width modulation of the switching of fuel cell 2 to fuel-cell system 1, system voltage $U_0$ may be regulated independently of load. In this context, to further stabilize the voltage, the frequency of the pulse-width modulation may, of course, by increased.

The pulse-width modulation constitutes a fundamental alternative to pure switching in the area of the voltage window or voltage region formed by upper limiting voltage $U_2$ and lower limiting voltage $U_1$.

As already mentioned, the pulse-width modulation is able to be influenced by a change in the pulse width. Thus, for example, given a rising system voltage $U_0$, the pulse width of the phases in which fuel cell 2 is switched to fuel-cell system 1, is able to be shortened. This applies comparably, of course, to the previously described variant as well, where the switch is made between limiting voltages $U_1$, $U_2$. These predefined minimum and maximum system voltages may be varied as a function of the battery's charge state, it being possible to enlarge, reduce or, for example in response to a rising load state of battery 6, altogether shift the voltage window.

It is a basic assumption for system voltage $U_0$ in fuel-cell system 1, that a sufficient quantity of operating agents for the power requirements always be able to be provided by devices 4a, 4b for supplying the operating agents. To ensure this, even given comparatively cost-effective and simply designed devices 4a, 4b for supplying the operating agents, which, conditionally thereupon, in principle, as already explained above, become substantially not dynamic, a controlled or regulated variable may be generated via the switching cycles of switch 9 for activating or regulating devices 4a, 4b for supplying the operating agents.

Thus, for example, the quantity of operating agents supplied by devices 4a, 4b for providing operating agents, in particular the quantity of hydrogen made available for anode region 2a of fuel cell 2, may be controlled as a function of the charge state of fuel cell 2 and/or of a load and charge state of energy accumulator 5. It is thereby possible to ensure, right from the start, that sufficient operating agents attain fuel cell 2, before battery 6 is no longer able to supply the desired voltage due to a poor charge state.

In the case of a dropping charge state of battery 6 or a rising load state in fuel-cell system 1, the quantity of supplied operating agents may be increased as a precautionary measure. An especially beneficial variable for implementing this control is, for example, the average charging current that fuel cell 2 uses to charge battery 6. The quantity of operating agents supplied to anode side 2a of fuel cell 2 may be varied as a function of this average charge current.

Conversely, it is also possible, of course, that, given a signal that a drop in the quantity of operating agents is imminent, for example because stores are slowly becoming empty, a check-back signal is sent to fuel-cell system 1. Therefore, particularly in the case of a dropping quantity of operating agents on anode side 2a of fuel cell 2, the average charging current may be reduced as a precautionary measure.

A type of "emergency-off" variant may also be integrated in such a system, so that when a predefined minimal charging current of battery 6 is undershot, both fuel cell 2 as well as devices 4a, 4b for supplying the operating agents may be switched off to prevent any damage to the system components.

What is claimed is:
1. A fuel-cell system comprising:
a fuel cell;
a device for supplying operating agents of the fuel cell; and
an electrical energy accumulator connected to the fuel cell via an electrical connection, the energy accumulator having a battery with a battery internal resistance and an intermediate charge store having a charge store internal resistance, the charge store internal resistance having a lower resistance than the battery internal resistance; and a switch provided in the electrical connection between the energy accumulator and the fuel cell, wherein the intermediate charge store has a capacitor.

2. The fuel-cell system as recited in claim 1, wherein the switch is an electrical switch made of semiconductor components.

3. The fuel-cell system as recited in claim 1, wherein the fuel cell has a cathode region and an anode region, the device for supplying the operating agents including an air-supply system to supply the cathode region, and a gas-generating system to supply the anode region.

4. The fuel-cell system as recited in claim 3, further comprising a storage device disposed between the anode region and the gas-generating system for intermediately storing unconsumed operating agents.

5. The fuel-cell system as recited in claim 3 wherein, the anode region of the fuel cell includes a bypass line via which the operating agent is brought into circulation.

6. The fuel-cell system as recited in claim 5, further comprising a jet pump capable of being driven by a volumetric flow of the operating agents delivered by the gas-generating system.

7. A fuel-cell system comprising:
a fuel cell;
a device for supplying operating agents of the fuel cell; and
an electrical energy accumulator connected to the fuel cell via an electrical connection, the energy accumulator having a battery with a battery internal resistance and an intermediate charge store having a charge store internal resistance, the charge store internal resistance having a lower resistance than the battery internal resistance; and
a switch provided in the electrical connection between the energy accumulator and the fuel cell,
wherein the intermediate charge store has a supercap capacitor.

8. A fuel-cell system comprising:
a fuel cell;
a device for supplying operating agents of the fuel cell; and
an electrical energy accumulator connected to the fuel cell via an electrical connection, the energy accumulator having a battery with a battery internal resistance and an intermediate charge store having a charge store internal resistance, the charge store internal resistance having a lower resistance than the battery internal resistance; and
a switch provided in the electrical connection between the energy accumulator and the fuel cell,
wherein the intermediate charge store has a coil.

9. A method for operating a fuel-cell system having a fuel cell, a device for supplying operating agents of the fuel cell, an electrical energy accumulator connected to the fuel cell via an electrical connection, the energy accumulator having a battery with a battery internal resistance and an intermediate charge store having a charge store internal resistance, the charge store internal resistance having a lower resistance than the battery internal resistance, and a switch provided in the electrical connection between the energy accumulator and the fuel cell, comprising the step of:

regulating a system voltage of the fuel cell system in response to an opening or closing of the switch to charge the energy accumulator so as to maintain the system voltage within a predefined voltage range;
wherein the battery is charged during the time periods in which the switch is open using the intermediate charge store.

10. The method as recited in claim 9, wherein, in response to a predefined minimal system voltage being undershot, the switch is closed, and, in response to a predefined maximum system voltage being exceeded, the switch is opened.

11. The method as recited in claim 10, wherein the predefined minimal and maximum system voltages are varied as a function of a charge state of the battery.

12. The method as recited in claim 9, wherein the connection between the fuel cell and the energy accumulator is switched in pulse-width modulated fashion, the pulse width being controlled as a function of the active system voltage.

13. The method as recited in claim 12, wherein, in response to a rising system voltage, the pulse width of the phases in which the fuel cell is connected to the system, is shortened.

14. The method as recited in claim 9, wherein the switching cycles of the switch are used as a controlled or regulated variable for activating or regulating the devices for supplying the operating agents.

15. The method as recited in claim 9, wherein a quantity of operating agents delivered by the devices for supplying the operating agents is controlled as a function of at least one of a load state of the fuel cell and of a load and charge state of the energy accumulator.

16. The method as recited in claim 15, wherein, in response to a dropping charge state of the battery or in response to a rising load state in the fuel-cell system, the quantity of operating agents delivered by the device for supplying the operating agents, is increased.

17. The method as recited in claim 9, wherein an average charging current that the fuel cell uses to charge the battery is varied as a function of the quantity of operating agents available on an anode side of the fuel cell.

18. The method as recited in claim 17, wherein, in response to a dropping quantity of operating agents on the anode side of the fuel cell, the average charging current is reduced.

19. The method as recited in claim 9, wherein, in response to a predefined minimal charging current of the battery being undershot, the fuel cell and the devices for supplying the operating agents are switched off.

20. A motor vehicle comprising a fuel-cell system as recited in claim 1.

* * * * *